(12) United States Patent
Anzai et al.

(10) Patent No.: US 8,656,752 B2
(45) Date of Patent: Feb. 25, 2014

(54) FLOW METER ADJUSTING METHOD, FLOW RATE MEASURING DEVICE AND ADJUSTMENT DATA CONTROLLING SYSTEM

(75) Inventors: Masanori Anzai, Tokyo (JP); Junichi Matsuda, Tokyo (JP); Manabu Muraoka, Tokyo (JP)

(73) Assignee: Azbil Corporation, Tokyo (JP)

( * ) Notice: Subject to any disclaimer, the term of this patent is extended or adjusted under 35 U.S.C. 154(b) by 728 days.

(21) Appl. No.: 12/664,573

(22) PCT Filed: May 19, 2008

(86) PCT No.: PCT/JP2008/001246
§ 371 (c)(1),
(2), (4) Date: Jun. 4, 2010

(87) PCT Pub. No.: WO2009/001500
PCT Pub. Date: Dec. 31, 2008

(65) Prior Publication Data
US 2010/0236646 A1    Sep. 23, 2010

(30) Foreign Application Priority Data

Jun. 25, 2007   (JP) ................................ 2007-166573

(51) Int. Cl.
*G01F 25/00* (2006.01)
(52) U.S. Cl.
USPC ......................................................... 73/1.16
(58) Field of Classification Search
USPC ......................................................... 73/1.16
See application file for complete search history.

(56) References Cited

U.S. PATENT DOCUMENTS

| 5,987,981 A * | 11/1999 | Boer ........................... 73/202.5 |
| 6,779,395 B2 * | 8/2004 | Hornung et al. ........... 73/204.21 |
| 7,523,639 B2 | 4/2009 | Hays |
| 8,181,513 B2 * | 5/2012 | Anzai et al. ..................... 73/202 |
| 2007/0193334 A1 | 8/2007 | Hays |

FOREIGN PATENT DOCUMENTS

| JP | 9-043016 A | | 2/1997 |
| JP | 10307047 A | * | 11/1998 |
| JP | 2004-251686 A | | 9/2004 |
| JP | 2005-507996 A | | 3/2005 |
| JP | 2007-71695 A | | 3/2007 |
| WO | 03/032101 A1 | | 4/2003 |
| WO | 2005/062003 A1 | | 7/2005 |
| WO | WO 2005062003 A1 | * | 7/2005 |

\* cited by examiner

*Primary Examiner* — Hezron E Williams
*Assistant Examiner* — Mark A Shabman
(74) *Attorney, Agent, or Firm* — Troutman Sanders LLP

(57) ABSTRACT

A body section having a main channel through which a fluid to be measured flows and sections for shunting the fluid to be measured from the main channel, and a fluid measuring section provided removably from the body section and measuring the flow rate of the fluid to be measured flowing through the main channel based on the detection results of the fluid to be measured introduced from the shunting section. The fluid measuring section is fixed to the body section and shunt ratio data, i.e. the adjustment data about measurement processing inherent to the constitution of the body section, is registered in the fluid measuring section before adjusting measurement processing.

6 Claims, 8 Drawing Sheets

FIG. 5

| Area Secured in the EEPROM | Content | Reading Operation | Writing Operation |
|---|---|---|---|
| Equipment Information | Model number, equipment type identification setting value, shipping options, etc. | At Startup | Recorded through communication at shipping |
| Flow Rate Adjustment Information | Bypass adjustment data, branch flow ratio data, etc. | At Startup | Recorded through communication at shipping |
| Setting Information | Function sections, parameter settings | At Startup | Recorded through communication at shipping or changed through a key operation value |
| Historic Information | Summation value history | At Startup | Stored periodically (10 minutes) |
| | Status and alarm history | At Startup | Stored periodically (every xx minutes) |

FLOW METER ADJUSTING METHOD, FLOW RATE MEASURING DEVICE AND ADJUSTMENT DATA CONTROLLING SYSTEM

CROSS-REFERENCE TO RELATED APPLICATION

This is the U.S. National Phase application under 35 U.S.C. §371 of International Application No. PCT/JP2008/001246, filed May 19, 2008, which claims the benefit of Japanese Application No. 2007-166573, filed Jun. 25, 2007 each of which is hereby incorporated by reference in its entirety herein. The International Application was published in the Japanese Language on Dec. 31, 2008 as WO 2009/001500 A1 under PCT Article 21 (2).

FIELD OF THE INVENTION

The present invention relates to a flow meter adjusting method, a flow rate measuring device, and an adjustment data controlling system.

BACKGROUND OF THE INVENTION

As a conventional flow meter, there is, for example, that which is disclosed in Japanese Patent 3630916, which is hereby incorporated by reference in its entirety. This flow meter is provided with a flow path block that has a main tube path (a main flow path) that connects to a pipe wherein a fluid to be measured flows, where a pressure difference due to a narrowing mechanism in the main tube path is used to branch the flow of the fluid to be measured to a branch flow path that is connected to the main tube path. A thermal flow rate sensor for detecting a thermal shift that depends on the flow of the fluid to be measured is provided in the branch flow path, making it possible to measure the fluid to be measured down to the range of extremely small flow rates.

The correspondence between the flow in the branch flow path and the flow rate of the fluid to be measured that is flowing in the main flow path is used in this conventional flow meter. For example, as described in Japanese Patent 2517401, which is hereby incorporated by reference in its entirety, calibration of the flow rate sensor that is disposed in the branch flow path is performed to produce a correspondence curve that indicates the relationship between the flow rate of the fluid to be measured and the sensor signal value, where an approximation formula for the calibration curve is calculated using the least squares method, or the like. The flow rate of the fluid to be measured is calculated using the approximation formula when measuring the flow rate of the fluid to be measured, flowing in the main flow path.

Because, in the conventional flow meter, the flow rate is measured using an approximation formula that expresses the relationship between a sensor signal value of the flow rate sensor and the flow rate of the fluid to be measured that is flowing in the main flow path, this approach is susceptible to the effects of variability in the sensor signal value due to differences between the flow rate sensors, and thus there is the problem of having to do unit-by-unit adjustments when sensors are changed, which cannot be performed easily. FIG. 10 is a diagram illustrating the relationship between the signal value for the flow rate sensor disposed on the branch flow side and the flow rate of the fluid to be measured that is flowing in the main flow path. As illustrated in FIG. 10, with a conventional flow meter, the fluid to be measured is caused to flow in the main flow path at, for example, 50, 100, and 200 (L/min) as reference flow rates, and the flow rates of the fluid to be measured are measured for each using the flow rate sensor on the branch flow side at each of these reference flow rates, to obtain sensor signal values a1, a2, and a3. These measured values are used to calculate an approximation formula a of a calibration curve that expresses the relationship between the flow rate of the fluid to be measured that flows through the main flow path and the sensor signal value from the flow rate sensor, and the relationship between the flow of the fluid to be measured in the branch flow path and the flow rate of the fluid to be measured that flows in the main flow path is specified by this approximation formula a.

However, when it is necessary to change the flow sensor due to a failure, or the like, and the flow rate sensor is simply exchanged without performing any type of adjustments, there will be variability in the sensor signal values, due to differences between the flow rate sensor units, even if the flow rate of the fluid to be measured, flowing in the branch flow side, is the same as before the flow rate sensor was exchanged. Because of this, when a sensor is changed in a conventional flow meter, it is necessary to readjust the relationship between the sensor signal value and the flow rate of the fluid to be measured that is flowing in the main flow path in accordance with the sensor after the swap because the sensor signal values will go to b1 and c1, given the sensor after the fit swap, when the flow rate of the fluid to be measured is at the 50 L/min standard flow rate, for example, as illustrated in FIG. 10.

In this case, calibration must be performed as described above on the flow sensor after the swap to calculate the approximation formula (the approximation formulas b and c in the example illustrated in FIG. 10) for the calibration curves that show the relationships between the sensor signal values and the flow rates of the fluid to be measured that flows in the main flow path, requiring the same calibration as at the time of shipping.

Additionally, in the conventional method for calibrating a flow meter, a device is required in order to measure the reference flow rate of the fluid to be measured, flowing in the main flow path, each time there is an adjustment, and it is difficult to perform the adjustment operation in an installation location that does not have this device. Because of this, it is necessary to remove the flow meter each time the sensor is swapped, in order to carry the flow meter from the installation location to a workshop, or the like, having the aforementioned device in order to perform the adjustment, and in some cases the flow rate measurements are not performed in the piping facilities during the period of the adjustment.

SUMMARY OF THE INVENTION

The present invention was created in order to solve problem areas such as set forth above, and the object thereof is to provide a flow meter adjusting method enabling adjustments to be performed quickly and easily using easy operations, and to provide a flow measuring device that uses a flow meter adjusted through this method, and to provide an adjustment data controlling system for controlling the adjustment data.

The flow meter adjusting method as set forth in the present invention is a method for adjusting a flow meter that is provided with a body portion having a main flow path wherein a fluid to be measured flows and a branch flow path for branching the flow of the fluid to be measured from the main flow path, and a fluid measuring portion, attached detachably to the body portion, for measuring the flow rate of the fluid to be measured in the main flow path, based on a detection result for the fluid to be measured that has been introduced from the branch flow path, comprising: a step for attaching the fluid measuring portion to the body portion; and a step for recording, in the fluid measuring portion, adjustment data relating to a measuring process that is unique to the configuration of the body portion, and for adjusting the measuring process.

The flow meter adjusting method according to the present invention adjusts the measuring process by having the adjusting data related to the measuring process that is unique to the configuration of the body portion be branch flow ratio data for the main flow path and the branch flow path of the body portion, associating the branch flow ratio data with identification information that identifies the body portion, and, when attaching the fluid measuring portion to the body portion, recording, in the fluid measuring portion, the branch flow ratio data corresponding to the identification information of the body portion.

The flow rate measuring device according to the present invention comprises a body portion having a main flow path wherein the fluid to be measured flows and a branch flow path for branching the fluid to be measured from the main flow path, and a fluid measuring portion, attached detachably to the body portion, for measuring the flow rate of the fluid to be measured in the main flow path, based on a detection result for the fluid to be measured that has been introduced from the branch flow path, wherein: adjustment data relating to the measuring process that is unique to the configuration of the body portion is set in the body portion, and the fluid measuring portion adjusts the measuring process by recording adjustment data corresponding to the body portion to be attached.

The adjustment data controlling system according to the present invention, for controlling adjustment data for a flow meter, comprising a body portion having a main flow path wherein the fluid to be measured flows and a branch flow path for branching the fluid to be measured from the main flow path, and a fluid measuring portion, attached detachably to the body portion, for measuring the flow rate of the fluid to be measured in the main flow path, based on a detection result for the fluid to be measured that has been introduced from the branch flow path, comprises: a recording portion for recording adjustment data pertaining to a measuring process that is unique to the configuration of the body portion, corresponding to identification information for identifying the body portion; and a communications processing portion for receiving the body portion identification information and for reading out, from the recording portion, adjustment data corresponding to the received identification information.

Given that the flow meter adjusting method as set forth in the present invention is a method for adjusting a flow meter that is provided with a body portion having a main flow path wherein a fluid to be measured flows and a branch flow path for branching the flow of the fluid to be measured from the main flow path, and a fluid measuring portion, attached detachably to the body portion, for measuring the flow rate of the fluid to be measured in the main flow path, based on a detection result for the fluid to be measured that has been introduced from the branch flow path, comprising: a step for attaching the fluid measuring portion to the body portion; and a step for recording, in the fluid measuring portion, adjustment data relating to a measuring process that is unique to the configuration of the body portion, and for adjusting the measuring process, there is the effect of being able to perform the adjustment of the flow meter at the installation location quickly and easily using simple operations.

Given that the flow meter adjusting method according to the present invention adjusts the measuring process by having adjusting data related to the measuring process that are unique to the configuration of the body portion acts as branch flow ratio data for the main flow path and the branch flow path of the body portion, associating the branch flow ratio data with identification information that identifies the body portion, and, when attaching the fluid measuring portion to the body portion, recording, in the fluid measuring portion, the branch flow ratio data corresponding to the identification information of the body portion, there is the effect of being able to perform the adjustment of the flow meter quickly and easily using easy operations.

Given that the flow rate measuring device according to the present invention comprises a body portion having a main flow path wherein the fluid to be measured flows and a branch flow path for branching the fluid to be measured from the main flow path, and a fluid measuring portion, attached detachably to the body portion, for measuring the flow rate of the fluid to be measured, flowing in the main flow path, based on a detection result for the fluid to be measured that has been introduced from the branch flow path, wherein: adjustment data relating to the measuring process that are unique to the configuration of the body portion are set in the body portion, and the fluid measuring portion adjusts the measuring process by recording adjustment data corresponding to the body portion to be attached, with the effect of being able to perform the fluid measuring portion swapping operation without removing the body portion from the pipe (that is, while still in an attached state), and the effect of being able to perform the adjustment of the flow meter easily by merely recording, in the new fluid measuring portion, adjustment data corresponding to the body portion to be attached.

Given that the adjustment data controlling system according to the present invention, for controlling adjustment data for a flow meter, comprising a body portion having a main flow path wherein the fluid to be measured flows and a branch flow path for branching the fluid to be measured from the main flow path, and a fluid measuring portion, attached detachably to the body portion, for measuring the flow rate of the fluid to be measured, flowing in the main flow path, based on a detection result for the fluid to be measured that has been introduced from the branch flow path, comprises: a recording portion for recording adjustment data pertaining to a measuring process that is unique to the configuration of the body portion, corresponding to identification information for identifying the body portion; and a communications processing portion for receiving the body portion identification information and for reading out, from the recording portion, adjustment data corresponding to the received identification information, there is the effect of being able to obtain the adjustment data properly, making it possible to adjust the flow meter quickly and easily.

BRIEF DESCRIPTION OF THE DRAWINGS

The forgoing and other features of the present invention will be more readily apparent from the following detailed description and drawings of illustrative ennoblements of the invention in which;

FIG. 5 is a diagram illustrating the data content of the non-volatile memory in FIG. 4.

Like reference numerals are used in the drawing figures to connote elements of the invention.

DETAILED DESCRIPTION OF THE INVENTION

Figure 1A:
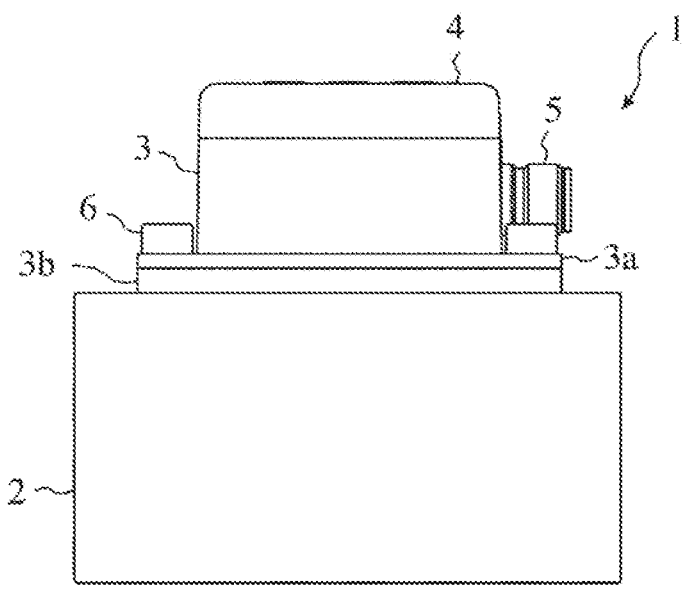
FIGS. 1(a)-1(c) are drawings illustrating the structure of a flow meter as set forth in a first form of embodiment according to the present invention.
Figure 1B:
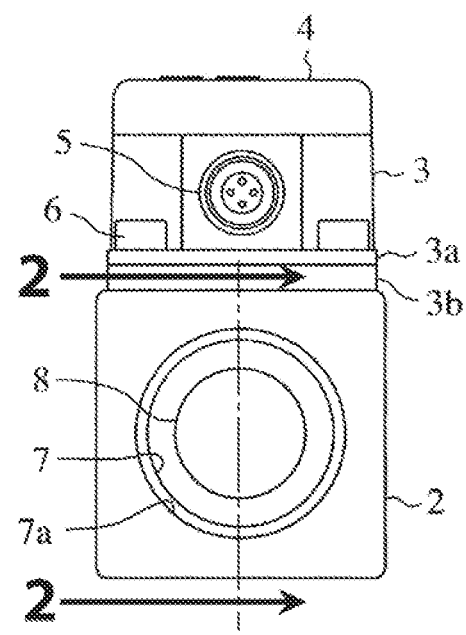
Figure 1C:
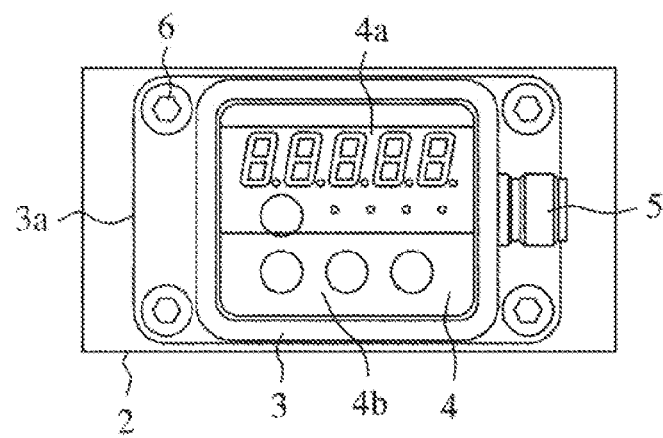

A preferred embodiment of the present invention will be described below in accordance with the appended drawings in order to describe the present invention in more detail.
First Form of Embodiment FIGS. 1(a)-1(c) illustrate the structure of a flow meter as set forth in a first form of embodiment according to the present invention, wherein FIG. 1 (a) shows a side view diagram, FIG. 1 (b) is a view from the b direction in FIG. 1 (a), and FIG. 1 (c) is a view from the a direction in FIG. 1 (a). As illustrated in FIG. 1 (a), the flow meter 1 according to the first form of embodiment is provided with a body portion 2 and a fluid measuring portion 3. The body portion 2 is a structural component that is attached to a pipe, not shown, wherein flows the fluid to be measured, and as illustrated in FIG. 1 (b), is provided with a main flow path wherein flows the fluid to be measured, and an orifice 8 in the flow path thereof. Additionally, on both ends of the main flow path 7 are provided attaching portions 7a wherein are formed screw threads, for attaching to pipes while maintaining airtightness through screwing onto the end portions of the pipes with, for example, airtight seals interposed therebetween.

In the fluid measuring portion 3, a measurement processing portion, such as a microcomputer, for performing measurement calculations of the flow rate, or the like, of the fluid to be measured is housed in a frame, and the frame is provided with a connector 5 for connecting a communications cable that becomes the propagation medium for signals that are exchanged between the measurement processing portion and an external device, and an attaching plate portion 3a is formed integrally with the fluid measuring portion 3. Additionally, the fluid measuring portion 3 is disposed on the body portion 2, from the attaching plate portion 3a side, with a base plate 3b, which contains a branched flow path structuring portion 11, described below in FIG. 2, which is one structure of the fluid measuring portion 3, interposed therebetween, and is attached to the body portion 2 by screwing attachment screws 6 into screw holes 6a, described below in FIG. 6. The fluid measuring portion 3 can be removed easily from the body portion 2 by removing the attachment screws 6 through turning the attachment screws 6. That is, the fluid measuring portion 3 is attached detachably to the body portion 2.

Additionally, a display/setting portion 4, provided with a display portion 4a and a setting inputting portion 4b, as illustrated in FIG. 1 (c) is provided on the fluid measuring portion 3. The display portion 4a displays the measurement results of the flow rate, or the like, of the fluid to be measured, inputted from the measurement processing portion. The setting inputting portion 4b is a structural element for inputting setting information into the measurement processing portion and the display portion 4a, where, for example, setting information, and the like, that switches the display content of the display portion 4a is inputted by the pressing of a setting button. Note that in the example in FIG. 1, a case is shown wherein the display portion 4a is provided on the fluid measuring portion 3. Conversely, the structure may be one wherein there is no display portion.

Figure 2:
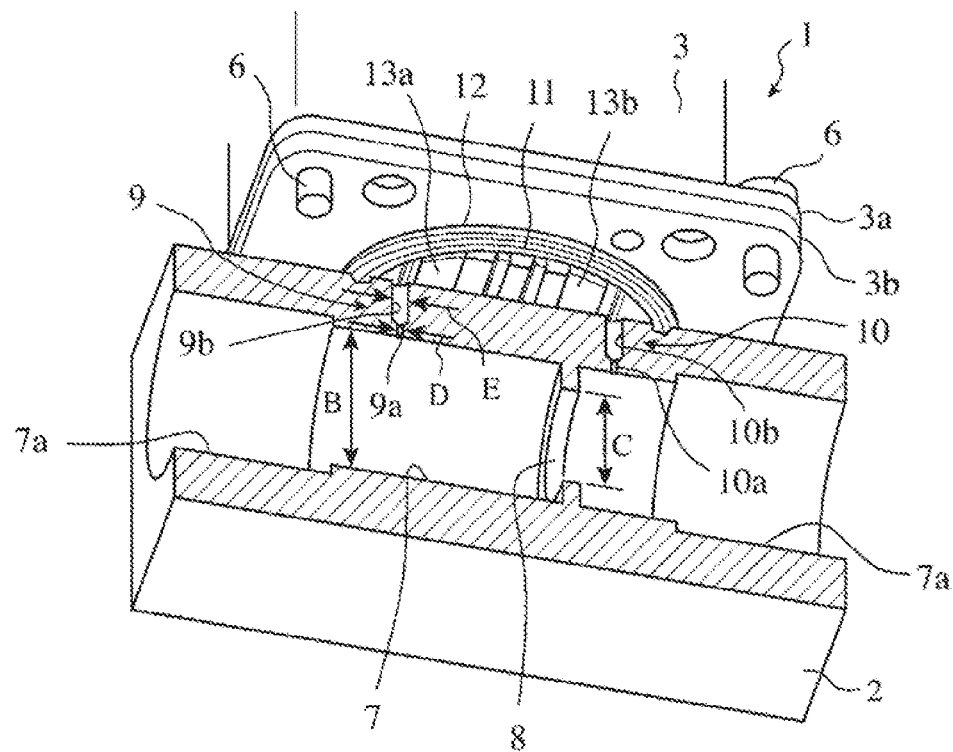
FIG. 2 is an oblique view illustrating a cross-section of the flow meter 1 as set forth in the first form of embodiment, cut along the section 2-2 in FIG. 1 (b).
Figure 6:
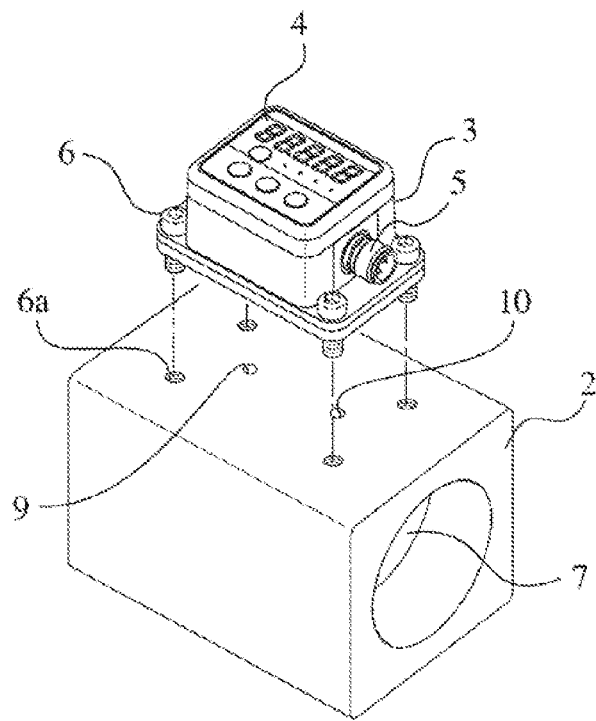
FIG. 6 is a diagram illustrating the state wherein the fluid measuring portion in FIG. 1 has been removed from the body portion.

FIG. 2 is a perspective view illustrating a cross-section wherein the flow meter 1 as set forth in the first form of embodiment is sectioned along the line 2-2 in FIG. 1 (b). As illustrated in FIG. 2, a hole portion is formed in the center portion of the base plate 3b, and the branched flow path structuring portion 11 is disposed in this hole portion, with a rubber packing 12, which is preferably elliptical in its cross section, is disposed so as to encompass the branched flow path structuring portion 11. The branched flow path structuring portion 11 is a plate-shaped member wherein flow paths are formed on both the body portion 2 side and the fluid measuring portion 3 side. Screwing attachment screws 6 into the screw holes 6a, described below in FIG. 6, provided in the body portion 2 with the branched flow path structuring portion 11 with the fluid measuring portion 3 configured in the installed state causes the rubber packing 12 to be pressed against the surface of the sensor 15 side of the attaching plate portion 3a and against the attaching surface of the body portion 2, to seal the branched flow path structuring portion 11.

Additionally, a branch flow portion 9 and a branch flow portion 10, which connect to the main flow path 7, are formed before and after the orifice 8. In the present form of embodiment, the branch flow portions 9 and 10 are shaped as orifices. The pressure differential produced by the orifice 8 causes the fluid to be measured to branch and flow into the branched flow path structuring portion 11 through the branch flow portion 9, and causes the fluid to be measured that has passed through the branched flow path structuring portion 11 to flow out through the branch flow portion 10 into the main flow path 7. Note that the fluid to be measured that flows between the body portion 2 and the fluid measuring portion 3 through the branch flow portions 9 and 10 undergoes particulate removal through filters 13a and 13b that are disposed in the branched flow path structuring portion 11. Furthermore, as necessary, the structure may instead exclude filters 13a and 13b.

The branch flow portions 9 and 10 are structured from small diameter (diameter D) narrow portions 9a and 10a that penetrate to the main flow path 7, and hole portions 9b and 10b of an opening diameter (diameter E) that is larger than that of the narrow portions 9a and 10a, connecting thereto. In the fluid to be measured that has a flow that branches from the main flow path 7, the flow speed is increased by the small opening diameter narrow portion 9a, where the flow speed is decreased by the hole portion 9b wherein the hole diameter is larger than that of the narrow portion 9a, and this fluid to be measured is introduced into the branched flow path structuring portion 11. The narrow portions 9a and 10a may have, for example, a diameter of about 1 mm, or may be structured with holes having an even smaller opening diameter in a range that does not deviate from the spirit or intent of the present invention, where the hole portions 9b and 10b may have opening diameters capable of relaxing the flow speeds of the fluid to be measured that has been increased through the narrow portions 9a and 10a.

Figure 3:
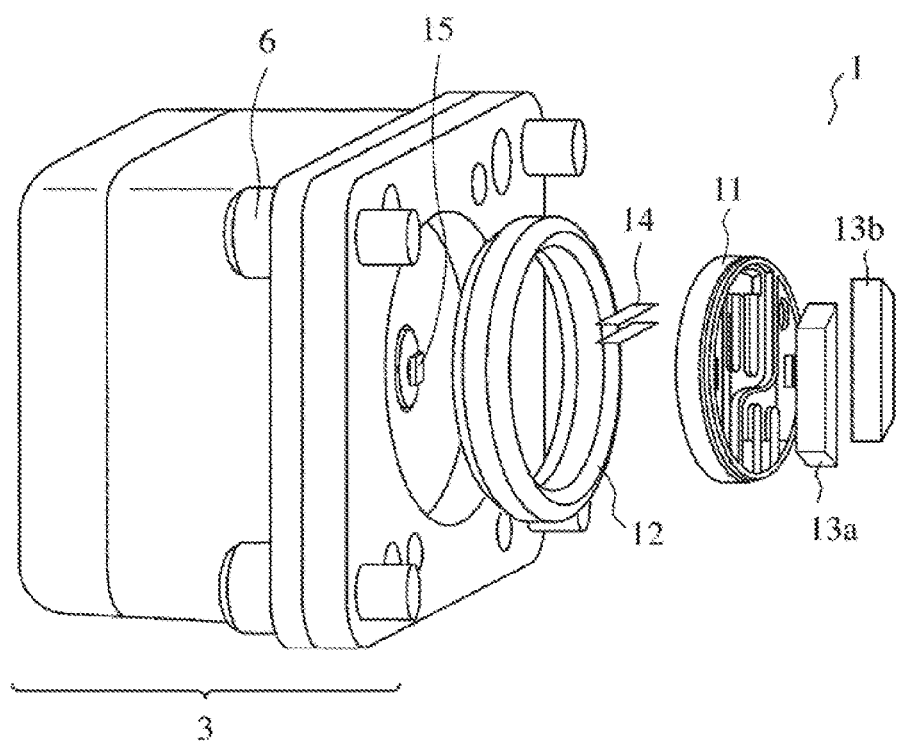
FIG. 3 is an assembly perspective diagram illustrating the fluid measuring portion from FIG. 1 with the surrounding structure.

FIG. 3 is a perspective view assembly diagram illustrating the fluid measuring portion in FIG. 1. As illustrated in FIG. 3, a sensor 15 for detecting the fluid to be measured is provided on the surface of the body portion 2 side of the fluid measuring portion 3, where the fluid measuring portion of the sensor 15 faces the flow path that is formed on the fluid measuring portion 3 side of the branched flow path structuring portion 11. The branched flow path structuring portion 11 has flow paths structured on both the body portion 2 side and the fluid measuring portion 3 side, where the fluid to be measured for which the flow branches from the main flow path 7 through the branch flow portion 9 flows into a third flow path that is formed on the surface on the fluid measuring portion 3 side from the first flow path that is formed on the surface on the body portion 2 side, and after flowing past the sensor 15 that is exposed in the third flow path, returns from a second flow path formed on the surface on the body portion 2 side, to flow out into the main flow path 7 through the branch flow portion 10.

Additionally, along with the filters 13a and 13b for particulate removal being provided in the branched flow path structuring portion 11 on the body portion 2 side surface thereof, a metal mesh 14 may be provided on the fluid measuring portion 3 side surface, as illustrated in FIG. 3. The metal mesh 14 is disposed on the upstream side of the sensor 15 in the flow path that is formed on the surface of the branched flow path structuring portion 11 on the fluid measuring portion 3 side, thereby makes it possible to straighten any biased flow or turbulence in the fluid to be measured prior to being directed to the sensor 15. The fluid measuring portion 3 will be explained next.

Figure 4:
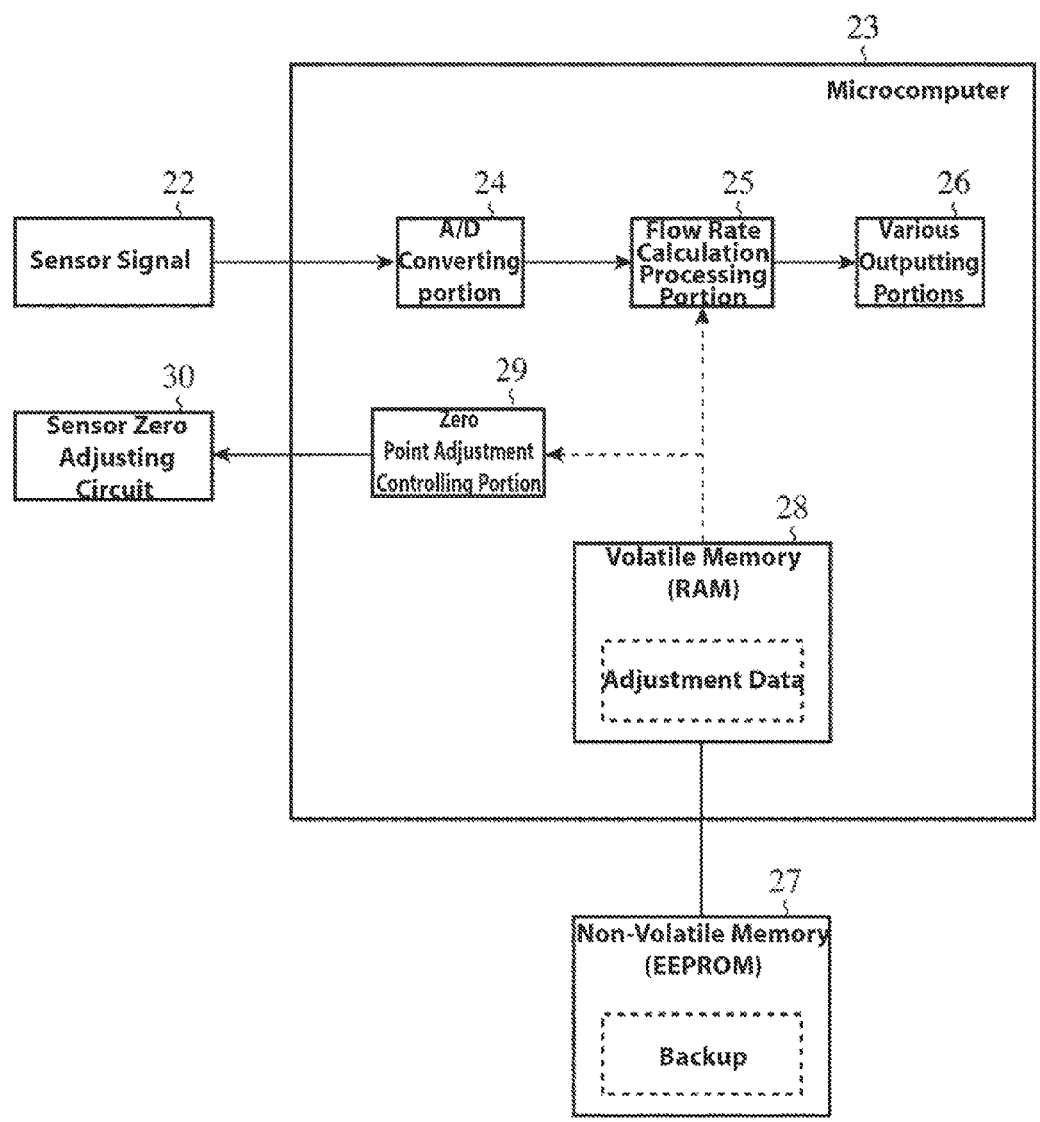
FIG. 4 is a block diagram illustrating the structure of the measurement processing portion in the fluid measuring portion in FIG. 1.

FIG. 4 is a block diagram illustrating the structure of a measurement processing portion in the fluid measuring portion in FIG. 1. The measurement processing portion is embodied by the CPU of a microcomputer 23 performing a measurement processing program, as specific means wherein hardware and software operate jointly, and has an A/D converting portion 24, a flow rate calculation processing portion 25, various types of outputting portions 26, and a zero point adjustment controlling portion 29 as functional structural blocks.

The A/D converting portion 24 performs analog/digital conversion on a sensor signal inputted from the sensor 15, and outputs the results to the flow rate calculation processing portion 25. The flow rate calculation processing portion 25 uses adjustment data read in from a volatile memory 28 to calculate the flow rate value of the fluid to be measured from the sensor signal inputted from the sensor 15. The various outputting portions 26 are structural portions for outputting, to the outside, the calculation results from the flow rate calculation processing portion 25, corresponding, for example, to the interface circuit, or the like, connected to the display portion 4a of the display setting portion 4, or the connector 5, illustrated in FIG. 1.

A non-volatile memory 27 stores adjustment data in accordance with the pipe configuration to which the flow meter 1 is attached, and is embodied by, for example, a EEPROM (Electrically Erasable Programmable Read-Only Memory). The volatile memory 28 is preferably a RAM (Random Access Memory) from which can be read appropriate data by the flow rate calculation processing portion 25 and the zero point adjustment controlling portion 29.

The zero point adjustment controlling portion 29 uses the adjustment value read-out from the volatile memory 28 and outputs, to the sensor zero adjusting circuit 30, a control signal for adjusting the zero point of the sensor 15. The sensor zero adjusting circuit 30 performs the adjustment of the zero point of the sensor 15 based on a control signal from the zero point adjustment controlling portion 29, or in other words, performs the adjustment of the output shift due to differences in the individual units for the sensors 15 and the measurement processing portions. Note that the adjustment value of the volatile memory 28 is thereby read-out from the non-volatile memory 27 at the time that the power supply is turned ON, and is stored temporarily in the volatile memory 28.

FIG. 5 is a diagram illustrating the data content of the non-volatile memory in FIG. 4. As illustrated in FIG. 5, the non-volatile memory 27 has a memory area for each category of adjustment data, and is thereby read-out to the volatile memory 28 when the flow meter 1 is started up. Categories for the adjustment data include equipment information, flow rate adjustment information, setting information, and historic information. The equipment information is information unique for each flow meter 1, such as the model number, a set value for the equipment type, shipping options, and the like, and are recorded in advance in the non-volatile memory 27 at the time of shipping. As the recording method there is recording from the outside through, for example, the connector 5.

The setting information is not information for correcting the fluid measurement by the flow meter 1, but rather setting information regarding function selection and parameters in the flow meter 1. The setting information may be recorded in advance at the time of shipping, or may be inputted using the setting inputting portion 4b of the display/setting portion 4. The historic information is information such as the summation value history or the status of the calculation processing results by the fluid measuring portion 3, or operating history of the flow meter 1, such as an alarm history, and is recorded periodically to the non-volatile memory 27. The flow rate adjustment information (adjustment data) is information that is unique to the body portion 2, such as the bypass adjustment data or the branch flow ratio data, and is stored in advance in the non-volatile memory 27 at the time of shipping. The branch flow ratio data that is the flow rate adjustment information (adjustment data) is calculated through the measuring process set forth below.

Figure 10:
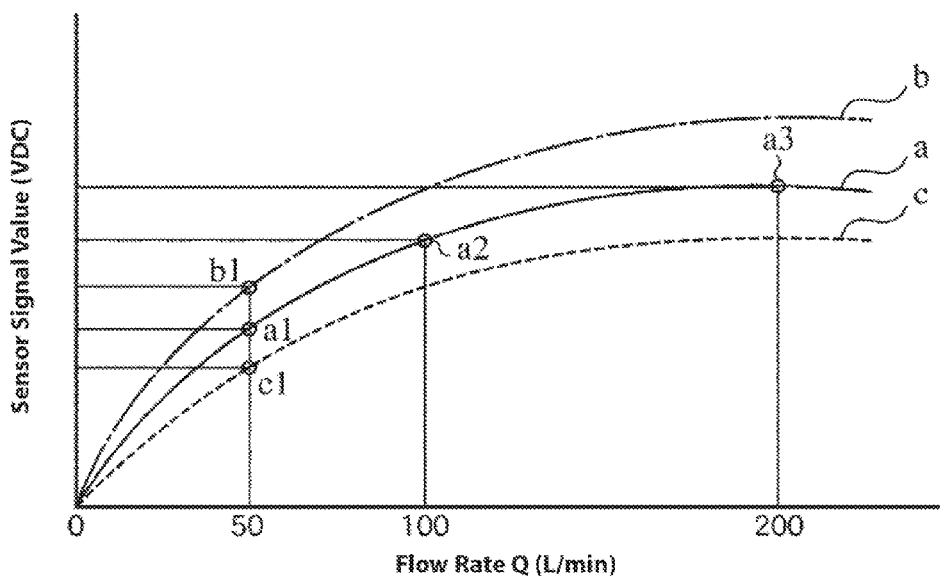
FIG. 10 is a diagram illustrating the relationship between the signal value of a conversional flow rate sensor disposed on the branch flow side and the flow rate of the fluid to be measured that flows through the main flow path.

First, as illustrated in FIG. 6, in a state wherein the fluid measuring portion 3 is removed from the body portion 2, the fluid to be measured is caused to flow at a specific flow rate in the branched flow path structuring portion 11 of the fluid measuring portion 3, the flow rate is measured by the sensor 15 that is exposed to the fluid to be measured, which flows through a flow path of the branched flow path structuring portion 11, and with the fluid to be measured branching into the branched flow path structuring portion 11 in a predetermined flow rate range (for example, between 0 and 3 L/min), the relationship formula $y=F(x)$ between the flow rate value for the fluid to be measured that branches into the branched flow path structuring portion 11 and the sensor signal value of the sensor 15 for the fluid measurement, disposed in the branched flow path, is calculated and stored in the non-volatile memory 27. If the fluid measuring portion 3 is viewed as a flow meter in this way, then the relationship of the flow rate value of the fluid to be measured flowing in the branch flow side, as illustrated in FIG. 10, and the sensor signal value of the sensor 15 for the flow rate measurement, disposed on the branch flow side, are adjusted.

Following this, the fluid measuring portion 3, after the adjustment, is attached to the body portion 2, as illustrated in FIG. 1, and a fluid to be measured is caused to flow at a specific standard flow rate in the main flow path 7 of the body portion 2, and the flow rate of the fluid to be measured that flows in the main flow path 7 and the flow rate of the fluid to be measured that flows in the branch flow path of the branched flow path structuring portion 11 are monitored individually at arbitrary adjustment points to calculate the relationship between the flow rate of the fluid to be measured that flows in the main flow path 7 and the flow rate of the fluid to be measured that flows in the branch flow path of the branched flow path structuring portion 11 to obtain the function y=G(x) between the main flow path 7 and the branch flow path, as the branch flow ratio data, from the result. Note that the branch flow ratio data may be calculated by measuring the flow rate in the main flow path 7 for the body portion 2 and the flow rate through the branch flow portions 9 and 10 using a device for measuring the flow rate on the branch flow side and the flow rate for the main flow path 7 independently, without attaching the fluid measuring portion 3 to the body portion 2.

In this way, in the present invention, the fluid measuring portion 3 is viewed as a flow meter that can measure independently in a specific flow rate range (with a full-scale flow rate of, for example, 3 L/min) to perform the adjustment using branch flow ratio data that indicates the relationship between the flow rate of the fluid to be measured that flows through the main flow path 7 and the flow rate of the fluid to be measured that flows through the branch flow path of the branched flow path structuring portion 11. Doing so enables flow rate measurements of the fluid to be measured by adjusting the relationship between the flow rate of the main flow path 7 and the flow rate of the branch flow path by merely setting the branch flow ratio data in the fluid measuring portion 3 when, due to a fault, a new fluid measuring portion 3 has been swapped in or a fluid measuring portion 3 has been replaced into a body portion 2 having a different opening diameter (full-scale flow rate), if the flow rate range of the fluid to be measured that flows into the branch flow side is specified by narrow portions 9a and 10a of the branch flow portions 9 and 10 that are formed in the body portion 2 and by the opening diameter of the orifice 8, and the like.

In this way, in the operation to swap the fluid measuring portion 3 it is possible to perform measurements by completing the adjustment by merely recording the branch flow ratio data corresponding to the body portion 2 to be attached. Additionally, when the fluid measuring portion 3 is attached to a body portion 2 that has a different opening diameter for the main flow path 7, then if the fluid measuring portion 3 has a flow rate measuring range corresponding to the branch flow ratio of the body portion 2 to be attached, then it will be possible to use a single type of fluid measuring portion 3 in multiple locations without being affected by the individual differences in the fluid sensors.

Figure 7:
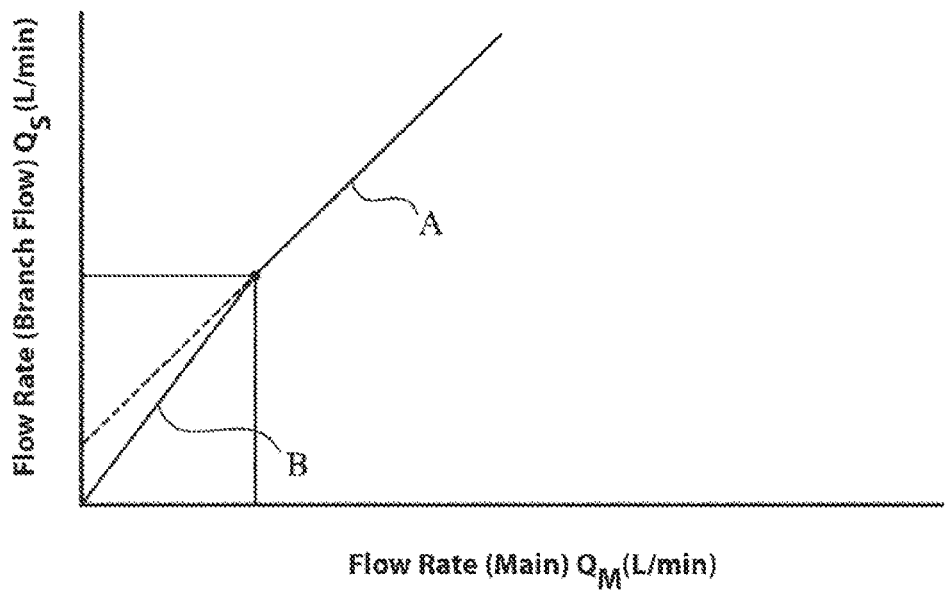
FIG. 7 is a diagram illustrating the relationship between the flow rate of the fluid to be measured that flows in the main flow path and the flow rate of the fluid to be measured that flows in the branch flow path.

FIG. 7 is a diagram illustrating the relationship between the flow rate of the fluid to be measured that flows in the main flow path and the flow rate of the fluid to be measured that flows in the branch flow path, where the flow rate $Q_M$ of the main flow path 7 for the body portion 2 and the flow rate $Q_S$ for the branch flow through the branch flow portions 9 and 10 are obtained through measurements of a plurality of points. In the example in FIG. 7, measurement values for which linear approximations can be made through the zero point can be obtained in the low flow rate range, and on the higher flow rate range side, measurement values for which linear approximations can be made that do not pass through the zero point can be obtained. In this case, equation A can be used for the high flow rate range, and equation B can be used for the low flow rate range. When extending equation A, it will appear to look like the one indicated by the dotted line portion, but equation B ($QS=C1\times$flow rate $QM$)) will be used instead. The linear approximation for the dotted line portion that extends the correlation equation A that is represented by the flow rate $Q_S=C2\times$flow rate $Q_M+D$ that approximates the characteristics on the high flow rate range side is approximated by the correlation equation represented by the flow rate $Q_S=C1\times$ flow rate $Q_M$ that passes through the zero point that approximates the relationship between the flow rate $Q_S$ and the flow rate $Q_M$ that were actually found, to determine the flow rate ratio data by these correlation equations A and B.

The flow rate ratio data is affected by the structural characteristics of the branch flow portions 9 and 10 and the main flow path 7 formed in the body portion 2, such as, for example, variability in dimensions caused by machining precision. Given this, measuring the flow rate $Q_M$ and the flow rate $Q_S$, as described above, and approximating properly the relationship between the flow rate $Q_M$ and the flow rate $Q_S$ derived from the actual measured values, in a form that is actually corresponding, it is possible to calculate the branch flow ratio data matching the characteristics of the structure for each body portion 2. Doing so makes it possible to ensure accuracy after swapping the fluid measuring portion 3.

Figure 8A:
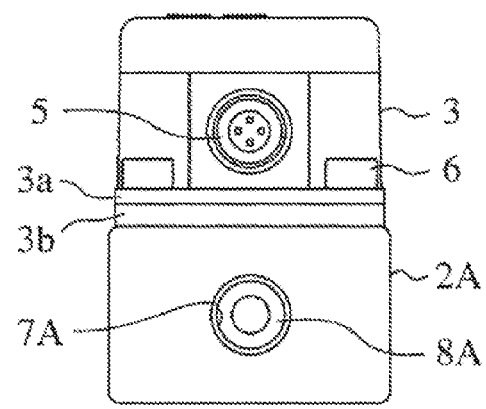
FIGS. 8(a)-8(c) are drawings illustrating flow meters having body portions of different opening diameters with different full-scale flow rates.
Figure 8B:
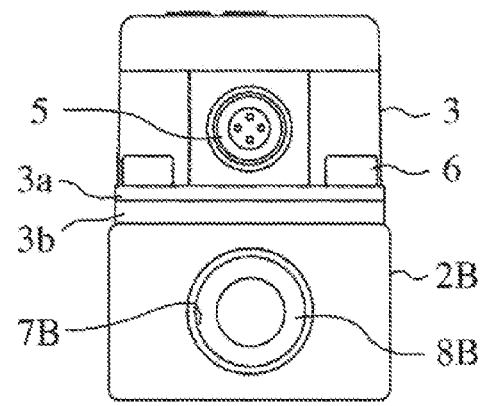
Figure 8C:
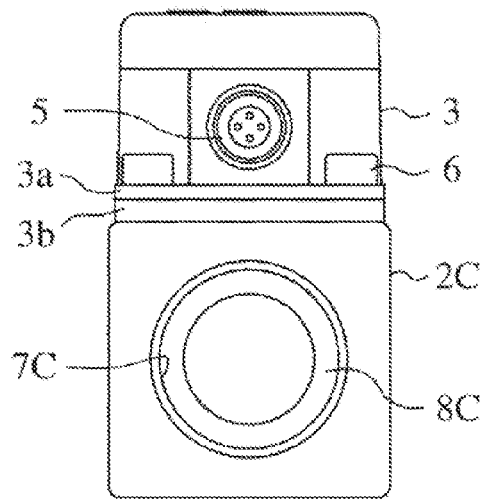

The method for adjusting the flow meter 1 as set forth in the first form of embodiment will be explained using an example of a case wherein the branch flow ratio data set forth above is used. FIGS. 8(a)-8(c) are drawings illustrating flow meters having body portions of various opening diameters with different full-scale flow rates, wherein if the opening diameter of the body portion 2 illustrated in FIG. 8 (c) is 1, then the opening diameter of the body portion in FIG. 8 (b) is ½, and the opening diameter of the body portion in FIG. 8 (a) is ¼.

The body portions 2A, 2B, and 2C illustrated in FIG. 8 have the diameter D of the narrow portion 9a of the branch flow portion 9 adjusted so that the flow rate of the branch flow to the branched flow path structuring portion 11 through the branch flow portion 9 at the time of the full-scale flow in the main flow paths 7A, 7B, and 7C will be a uniform flow. Specifically, in the body portions 2A, 2B, and 2C, the diameters of the main flow paths 7A, 7B, and 7C, the diameters of the orifices 8A, 8B, and 8C, and the diameter of the narrow portion 9a are set so that the cross-sectional area ratios determined by the flow path cross-sectional area of the narrow portion 9a divided by the flow path cross-sectional areas of the diameters of the orifices 8A, 8B, and 8C will be constant.

In the flow meter 1 in the first form of embodiment, the branch flow ratio data is calculated as described above and controlled for each body portion 2A, 2B, and 2C individually. When swapping to a new fluid measuring portion 3 for any of the body portions 2A, 2B, or 2C, which are attached to pipes, or when swapping a fluid measuring portion 3 that is attached to a body portion 2 to a different body portion 2 having a different opening diameter for the main flow path 7, the user records, to the non-volatile memory of the measurement processing portion within the fluid measuring portion 3, the branch flow ratio data corresponding to the body portion 2 that will be attached.

In this way, even though the body portions 2 have different opening diameters with different full-scale flow rates, it is possible to adjust the fluid measuring portion 3 so as to be able to perform measurements, by the simple process of recording the branch flow ratio data. Additionally, it is possible to use a common fluid measuring portion 3 in multiple locations. For example, if there is contamination adhering to the flow detecting portion of a sensor 15, causing the flow rate of the fluid to be measured, to which the fluid detecting portion is exposed, to fall, thereby changing the branch flow ratio, requiring swapping in a new fluid measuring portion 3, it is possible to continue the fluid measurements by setting the new fluid measuring portion 3 to the flow rate adjustment data corresponding to the body portion 2.

Note that the body portion 2 and branch flow ratio data may be controlled by, for example, establishing a correspondence of the branch flow ratio data with identification information that identifies the body portion 2. A label on which the branch flow ratio data is written, for example, may be used as this identification data. Applying such labels to the body portions 2A, 2B, and 2C makes it possible for the user to specify easily the branch flow ratio data, by the label of the body portion 2, when performing the operation for swapping the fluid measuring portion 3. Instead of a seal that is applied directly to the body portion 2, the label may instead be printed on the outer surface of the body portion 2.

Additionally, the branch flow ratio data of the body portions 2A, 2D, and 2C may instead be controlled without using labels on which the branch flow data is written. For example, an adjustment data controlling system may be structured provided with a computer that has a communications processing portion for communicating with a user terminal, and that has a database for storing branch flow ratio data corresponding to identification numbers (such as product numbers) for identifying the body portions 2A, 2B, and 2C. At the time of the operation for swapping the body portion 2 or the fluid measuring portion 3 at the installation location, the user may access the computer of this adjustment data controlling system through a user terminal to search the database using the identification number. The branch flow ratio data corresponding to the body portion 2 that is to be attached, obtained from the search results, is set into the non-volatile memory 27 of the fluid measuring portion 3. Note that a portable telephone or a PDA (Personal Digital Assistant) may be used as the user terminal, instead of a personal computer, such as a notebook personal computer. Structuring in this way makes it possible to perform the adjustment of the flow meter quickly and easily because it is possible to obtain the adjustment data accurately.

Aside from this, in a case wherein a new fluid measuring portion 3 is swapped onto a body portion 2, instead of using the aforementioned database for identifying the body portion 2, the branch flow ratio data of the body portion that was set in the non-volatile memory 27 of the old fluid measuring portion 3 may be transferred to the non-volatile memory 27 of the new fluid measuring portion 3.

As the method for recording the flow rate adjustment information, one may consider attaching an external setting inputting device and the fluid measuring portion 3 through a connector 5 to record the branch flow ratio data to the non-volatile memory 27 using the setting inputting device. Conversely, the flow meter 1 as set forth in the first form of embodiment may be structured so that data can be written to the non-volatile memory 27 using the display setting portion 4.

The flow rate measuring process in the flow meter 1 will be explained next.

Figure 9:
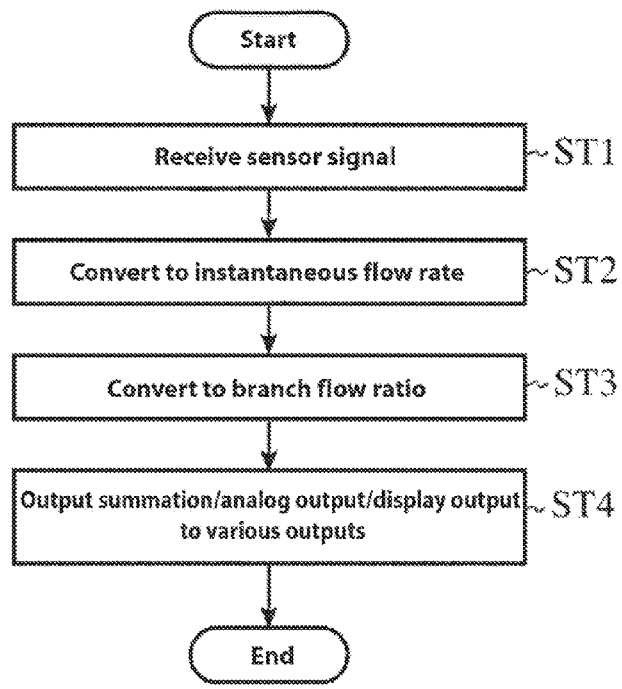
FIG. 9 is a flowchart illustrating the flow of the fluid measuring process using the flow meter of the first form of embodiment.

FIG. 9 is a flowchart illustrating the flow of the flow rate measuring process using the flow meter according to the first form of embodiment, where switching to a new fluid measuring portion 3, due to a failure, or the like, in the sensor 15 will be used as an example for the explanation. First, after swapping a new fluid measuring portion 3 onto the body portion 2, the detection result for the fluid to be measured, by the sensor 15 of the new fluid measuring portion 3, is received by the A/D converting portion 24 within the fluid measuring portion 3 as the sensor signal (Step ST1). The A/D converter performs analog/digital conversion on the sensor signal and outputs the result to the flow rate calculation processing portion 25.

The flow rate calculation processing portion 25 reads out the relation formula $y=F(x)$ for the sensor signal of the sensor 15 in the flow rate value from the volatile memory 28, and uses this relationship formula $y=F(x)$ and the sensor signal value obtained in Step ST1 to convert the sensor signal of the digital data that has been inputted from the A/D converting portion 24 into the instantaneous flow rate value for the flow in the branch flow portion 9 (Step ST2). Note that the relationship formula $y=F(x)$ is expressed as table data that approximates the relationship between the sensor signal value and the flow rate value as a piecewise linear approximation, and is known as correlation data (see FIG. 10). The calibration data is calibrated independently, viewing the fluid measuring portion 3 that is removed from the body portion 2, as described above, as a single flow meter, and the correspondence between the sensor signals and the flow rate values is obtained for a plurality of flow rate points and recorded in the non-volatile memory 27 at the time of product shipping.

The function $y=G(x)$ that defines the branch flow ratio data corresponding to the body portion 2 to be attached is recorded in the non-volatile memory 27 of the new fluid measuring portion 3, as described above. The branch flow ratio data is written from the non-volatile memory 27 to the volatile memory 28. The flow rate calculation processing portion 25 reads out the function $y=G(x)$ for the branch flow ratio data from the volatile memory 28, and uses this function $y=G(x)$ and the flow rate value from the branch flow portion 9, calculated in Step ST2 to calculate the flow rate value of the main flow path 7 (Step ST3). The performance of this process makes it possible to correct the branch flow ratio, which varies due to the dimensions of the flow path of the body portion 2 and due to individual differences in the dimension accuracy.

Finally, the various outputting portions 26 output the calculation results by the flow rate calculation processing portion 25 (Step ST4). For example, the measurement value summation results and data that is converted into an analog signal may be outputted, or may be displayed as display data on the display portion 4a.

In this way, in the body portions 2 that each have opening diameters with different full-scale flow rates, the flow rates for the branch flows into the branched flow path structuring portion through the branch flow portion 9 at of the full-scale flow rate being made to be constant values makes it possible to perform flow rate measurements through a simple recording operation even when a fluid measuring portion 3 that has been used on a body portion 2 with one opening diameter is swapped to a body portion 2 with a different opening diameter. Doing so makes it possible to use a common fluid measuring portion 3 in body portions 2 with different opening diameters, without having to prepare a new fluid measuring portion 3 having data in accordance with the pipe to which it is to be attached, in contrast to the conventional case wherein the flow rate adjustment data had to be recorded in advance, at the time of shipping, as data optimized for each different pipe, and could not be set by the user.

Note that the adjusting method set forth above can be applied in cases wherein the pipe opening diameter is large, so that it would have been difficult to remove the entity of the flow meter 1, including the body portion 2. That is, when there is a problem with a fluid measuring portion 3, maintenance can be performed through merely swapping the fluid measuring portion 3.

Additionally, because the flow meter 1 as set forth in the first form of embodiment does not have a normal tapered orifice structure, it is may be desirable to correct for tolerance error resulting therefrom; however, the correction can be performed easily through controlling the correspondence of the correction data for each individual body portion 2 to the identification data in this case as well.

Note that while the explanation set forth above illustrated a case wherein branch flow ratio data that has been measured in advance is used, instead specific constant values in accordance with the opening diameter of the body portion 2 or the dimension of the narrow structure may be set as the branch flow ratio data.

As set forth above, given the first form of embodiment, a body portion 2 having a main flow path 7, wherein a fluid to be measured flows, and branch flow of portions 9 and 10 for branching the flow of the fluid to be measured from the main flow path 7, and a fluid measuring portion 3, attached detachably to the body portion 2, for measuring the flow of the fluid to be measured that is flowing in the main flow path 7, based on a detection result for the fluid to be measured that has been introduced from the branch flow path 9 are provided, and, after the fluid measuring portion 3 has been attached to the body portion 2, branch flow ratio data, which is the adjustment data pertaining to the measuring process that is unique to the configuration of the body portion 2, is recorded to the fluid measuring portion, and thus it is possible to adjust the flow meter 1 in accordance with the body portion 2 through a simple recording operation, even when the fluid measuring portion 3 has been attached to a body portion 2 having a different opening diameter or narrowing mechanism.

In the method for adjusting the flow meter according to the present invention, as set forth above, a fluid measuring portion is attached to a body portion, and adjustment data pertaining to the measuring process that is unique to the configuration of the body portion is recorded in the fluid measuring portion in order to adjust the measuring process, and thus the method is appropriate for use for a flow meter for which adjustments are sought at the installation location.

While the invention has been particularly shown and described with reference to a number of preferred embodiments thereof, it will be understood by those skilled in the art that various changes in form and details may be made therein without departing from the sprit and scope of the invention. Accordingly, the invention is to be limited only by the scope of the claims and their equivalents.

The invention claimed is:

1. A method for adjusting a flow meter, comprising the steps of:
   providing a flow meter having
      a body portion attached to a pipe wherein a fluid to be measured flows, the body portion having
         a main flow path wherein the fluid to be measured flows, and
         a branch flow path branching the flow of the fluid to be measured from the main flow path and being provided with a hole portion having an opening diameter that relaxes a flow speed of the fluid, and
      a fluid measuring portion, attached detachably to the body portion by screwing a screw into a screw hole provided on an outer surface of the body portion, that measures the flow rate of the fluid to be measured, flowing in the main flow path, based on a detection result for the fluid to be measured that has been introduced from the branch flow path;
   attaching the fluid measuring portion to the body portion;
   recording in the fluid measuring portion flow rate adjustment data corresponding to the body portion described in identifying information provided on the body portion; and
   adjusting the measurement process based on the flow rate adjustment information that has been recorded.

2. The method of claim 1, wherein
the flow rate adjustment data is branch flow ratio data for the main flow path and the branch flow path of the body portion.

3. The method of claim 1, wherein
the flow rate adjustment data is an identification number for identifying the body portion, and
the method comprises the steps of:
   retrieving branch flow ratio data for the main flow path and the branch flow path of the body portion corresponding to the identification number;
   recording in the fluid measuring portion the branch flow ratio data that has been retrieved; and
   adjusting the measurement process based on the branch flow data that has been recorded.

4. The method of claim 1, wherein
the branch flow path of the body portion is further provided with a narrow portion having an opening diameter that is smaller than the opening diameter of the hole portion, and
the fluid flows from the main flow path into the branch flow path through the narrow portion, and then through the hole portion.

5. A flow rate measuring device comprising:
   a body portion attached to a pipe wherein a fluid to be measured flows, the body portion having
      a main flow path wherein the fluid to be measured flows, and
      a branch flow path branching the fluid to be measured from the main flow path and being provided with a hole portion having an opening diameter that relaxes a flow speed of the fluid; and
   a fluid measuring portion, attached detachably to the body portion by screwing a screw into a screw hole provided on an outer surface of the body portion, that measures the flow rate of the fluid to be measured, flowing in the main flow path, based on a detection result for the fluid to be measured that has been introduced from the branch flow path, wherein:
   the body portion is provided with identification information wherein flow rate adjustment information corresponding to the body portion is described; and
   in the fluid measuring portion the measurement process is adjusted based on recorded flow rate adjustment information through recording flow rate adjustment information described in the identification information that is provided on the body portion to be attached.

6. An adjustment data controlling system for controlling adjustment data for a flow meter, comprising:
   a flow meter that is provided with
      a body portion attached to a pipe wherein a fluid to be measured flows, the body portion having
         a main flow path wherein the fluid to be measured flows, and
         a branch flow path branching the flow of the fluid to be measured from the main flow path and being provided with a hole portion having an opening diameter that relaxes a flow speed of the fluid, and
      a fluid measuring portion, attached detachably to the body portion by screwing a screw into a screw hole provided on an outer surface of the body portion, that measures the flow rate of the fluid to be measured, flowing in the main flow path, based on a detection result for the fluid to be measured that has been introduced from the branch flow path;

a memory portion that stores branch flow rate data for the main flow path and the branch flow path of the body portion corresponding to an identification number for identifying the body portion; and a communications processing portion that receives an identification number of the body portion and for reading out and returning, from the storing portion, the branch flow ratio data corresponding to the identification number that has been received.

\* \* \* \* \*